(12) United States Patent
Teramoto

(10) Patent No.: US 8,897,346 B2
(45) Date of Patent: Nov. 25, 2014

(54) MODEM DEVICE AND AMPLITUDE ADJUSTMENT METHOD

(75) Inventor: Taro Teramoto, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 13/806,596

(22) PCT Filed: May 30, 2011

(86) PCT No.: PCT/JP2011/003004
§ 371 (c)(1),
(2), (4) Date: Dec. 21, 2012

(87) PCT Pub. No.: WO2011/161877
PCT Pub. Date: Dec. 29, 2011

(65) Prior Publication Data
US 2013/0101001 A1  Apr. 25, 2013

(30) Foreign Application Priority Data

Jun. 24, 2010  (JP) .................................. 2010-143633

(51) Int. Cl.
*H04L 27/08* (2006.01)
*H04L 27/36* (2006.01)
*H04L 27/38* (2006.01)

(52) U.S. Cl.
CPC .............. *H04L 27/08* (2013.01); *H04L 27/368* (2013.01); *H04L 27/364* (2013.01); *H04L 27/3854* (2013.01)
USPC ............ 375/222; 375/219; 375/295; 375/316

(58) Field of Classification Search
CPC . H04L 27/362; H04L 25/03019; H04L 27/08; H04L 27/364; H04L 27/368; H04L 27/3854
USPC .................................. 375/222, 219, 295, 316
See application file for complete search history.

(56) References Cited

U.S. PATENT DOCUMENTS 6,091,932 A * 7/2000 Langlais ....................... 725/111
7,103,029 B1 * 9/2006 Minowa ....................... 370/342
(Continued)

FOREIGN PATENT DOCUMENTS

JP   2004-222259 A   8/2004
JP   2006-523057 A   10/2006
(Continued)

OTHER PUBLICATIONS

International Search Report of PCT/JP2011/003004 dated Aug. 9, 2011.

*Primary Examiner* — Kenneth Lam
(74) *Attorney, Agent, or Firm* — Sughrue Mion, PLLC

(57) ABSTRACT

A modem device includes a modulation unit 12 that generates a modulated signal, a frequency conversion unit 15 that generates an intermediate frequency signal from an external input signal, and a demodulation unit 14 that demodulates the modulated or intermediate frequency signal and generates a reception signal. In a communication mode, the modulation unit 12 outputs the modulated signal to a external device 50, the frequency conversion unit 15 generates the intermediate frequency signal, and the demodulation unit 14 demodulates the intermediate frequency signal and generates the reception signal. In an adjustment mode, the modulation unit 12 outputs the modulated signal to the demodulation unit 14, and the demodulation unit 14 generates the reception signal from the modulated signal and adjusts an amplitude of the transmission signal based on the reception signal.

5 Claims, 5 Drawing Sheets

(56) References Cited

U.S. PATENT DOCUMENTS

| | | | |
|---|---|---|---|
| 7,469,017 B2 * | 12/2008 | Granstrom et al. | 375/295 |
| 2004/0137856 A1 | 7/2004 | Kanazawa et al. | |
| 2004/0203472 A1 * | 10/2004 | Chien | 455/68 |
| 2005/0238114 A1 * | 10/2005 | Ishikawa et al. | 375/298 |
| 2007/0223623 A1 * | 9/2007 | Rofougaran | 375/302 |
| 2009/0088101 A1 | 4/2009 | Agawa | |
| 2009/0185635 A1 * | 7/2009 | Okello | 375/267 |

FOREIGN PATENT DOCUMENTS

| | | |
|---|---|---|
| JP | 2006-311056 A | 11/2006 |
| JP | 2009-089269 A | 4/2009 |
| WO | 2004/082232 A1 | 9/2004 |

* cited by examiner

US 8,897,346 B2

MODEM DEVICE AND AMPLITUDE ADJUSTMENT METHOD

CROSS REFERENCE to RELATED APPLICATIONS

This application is a National Stage of International Application No. PCT/JP2011/003004 filed May 30, 2011, claiming priority based on Japanese Patent Application No. 2010-143633 filed Jun. 24, 2010, the contents of all of which are incorporated herein by reference in their entirety.

TECHNICAL FIELD

The present invention relates to a modem device and an amplitude adjustment method, and particularly to a modem device and an amplitude adjustment method using a signal fed back in the same device.

BACKGROUND ART

In wireless communication using mobile phones for example, a transmitter for transmitting data may modulate transmission data by quadrature modulation system such as QPSK, QAM, and the like to be transmitted to a receiver. In this case, fluctuation in the amplitude value (amplitude shift) and the like is generated in the data received by the receiver at the time of modulation by the transmitter. There is a problem that when the receiver demodulates a modulated signal with amplitude shift and the like being generated, characteristics of the reception signal deteriorate.

In order to solve such a problem, Patent Literature 1 discloses a quadrature modulation device that demodulates a signal generated by a quadrature modulator using a quadrature demodulator in the same device, and corrects the gain and the like of a signal to be quadrature modulated by the quadrature modulator using the demodulated signal. The quadrature modulation device disclosed in Patent Literature 1 is explained using FIG. 5.

The quadrature modulation device includes a signal for modulation generator 101, a correction unit 102, a digital-to-analog (D/A) converter 103, a quadrature modulator 104, a switch 105, a first local signal generator 106, a second local signal generator 107, a control unit 108, a frequency converter 109, an analog-to-digital (A/D) converter 110, a quadrature modulator 111, an error calculation unit 112, and an output terminal 113.

The quadrature modulator 104 generates a quadrature modulated signal X with a carrier frequency fc using an in-phase component signal I, a quadrature component signal Q, and a first local signal La that is output from the first local signal generator 106. The quadrature modulated signal X is output to the output terminal 113 through the switch 105 in a normal mode. Moreover, the quadrature modulated signal X is output to the frequency converter 109 through the switch 105 in a calibration mode.

The frequency converter 109 mixes the input quadrature modulated signal X and a second local signal with a frequency (fc-fi) that is output from the second local signal generator 107, and extracts only a signal Y in an intermediate frequency band centered on the frequency fi. The A/D converter 110 converts the signal Y output from the frequency converter 109 into a digital signal and outputs it to the quadrature demodulator 111.

The quadrature demodulator 111 multiplies a local signal with phases in quadrature and the frequency fi by the signal Y so as to demodulate the in-phase component signal I and the quadrature component signal Q in a modulation frequency band that is sufficiently lower than the intermediate frequency. The error calculation unit 112 calculates an amplitude error, a phase error, and the like in the quadrature modulator 104 based on the in-phase component signal I and the quadrature component signal Q. The control unit 108 notifies the correction unit 102 of a correction value that offsets the amplitude error, phase error, and the like that are calculated by the error calculation unit 112. The correction unit 102 executes correction on the in-phase component signal I and the quadrature component signal Q output from the signal for modulation generator 101 using the correction value notified by the control unit 108, and outputs them to the D/A converter 103.

Then, the quadrature modulation device can output a signal with corrected amplitude error, phase error, and the like that are generated in the quadrature modulator 104.

CITATION LIST

Patent Literature

Patent Literature 1: Japanese Unexamined Patent Application Publication No. 2006-311056

SUMMARY OF INVENTION

Technical Problem

However, the quadrature modulation device disclosed in Patent Literature 1 has the following problem. In the quadrature modulation device of Patent Literature 1, the frequency of the quadrature modulated signal X to be output to the output terminal 113 and the frequency converter 109 is the same. That is, a high frequency signal is used for the quadrature modulated signal X. Therefore, the quadrature modulated signal X is converted into the frequency of the intermediate frequency band by the frequency converter 109. Then, since the frequency of the quadrature modulated signal X used in the calibration mode is converted by the frequency converter 109, there is a problem that it is influenced by the noise in the frequency converter 109.

The present invention is made to solve such a problem and its object is to provide a modem device and an amplitude adjustment method that can process a signal output from a modulator without being influenced by noise in frequency conversion when a modulator and a demodulator are included in the same device.

Solution to Problem

A modem device according to a first exemplary aspect of the present invention includes modulation means that modulates a transmission signal and generates a modulated signal, frequency conversion means that converts a frequency of an external input signal that is input from an external device and generates an intermediate frequency signal, demodulation means that demodulates the modulated signal or the intermediate frequency signal and generates a reception signal, and adjustment means that adjusts an amplitude of the transmission signal. In a communication mode for communicating with the external device, the modulation means outputs to the external device a first modulated signal that is generated using the first frequency set at the time of output to the external device, the frequency conversion means converts a second frequency set to the external input signal into the intermediate frequency signal with a third frequency, and the demodulation means demodulates the intermediate frequency signal and generates a first reception signal. In an adjustment mode for adjusting the amplitude of the transmission signal, the modulation means outputs a second modulated signal generated using the third frequency to the demodulation means without passing the second modulated signal through the frequency conversion means, the demodulation means demodulates the second modulated signal and generates a second reception signal, and the adjustment means adjusts the amplitude of the transmission signal based on the second reception signal.

An amplitude adjustment method according to a second exemplary aspect of the present invention includes a step for modulating a transmission signal and generating a modulated signal, a step for converting a frequency of an external input signal and generating an intermediate frequency signal that is input from an external device, a step for demodulating the modulated signal or the intermediate frequency signal and generating a reception signal, a step for adjusting an amplitude of the transmission signal based on the reception signal. In a communication mode for communicating with the external device, the step for generating the modulated signal outputs to the external device a first modulated signal that is generated using a first frequency set at the time of output to the external device, the step for generating the intermediate frequency signal converts a second frequency set to the external input signal into an intermediate frequency, that is a third frequency, and generates the intermediate frequency signal, and the step for generating the reception signal demodulates the intermediate frequency signal with the third frequency being set and generates a first reception signal. In an adjustment mode for adjusting the amplitude of the transmission signal, the step for generating the modulated signal generates a second modulated signal generated using the third frequency, the step for generating the reception signal demodulates the second modulated signal and generates a second reception signal without executing the step for generating the intermediate frequency signal, and the step for adjusting the amplitude of the transmission signal adjusts the amplitude of the transmission signal based on the second reception signal.

Advantageous Effects of Invention

According to the present invention, it is possible to provide a modem device and an amplitude adjustment method that can process a signal output from a modulator without being influenced by noise in frequency conversion when a modulator and a demodulator are included in the same device.

DESCRIPTION OF EMBODIMENTS (First Embodiment)

Figure 1:
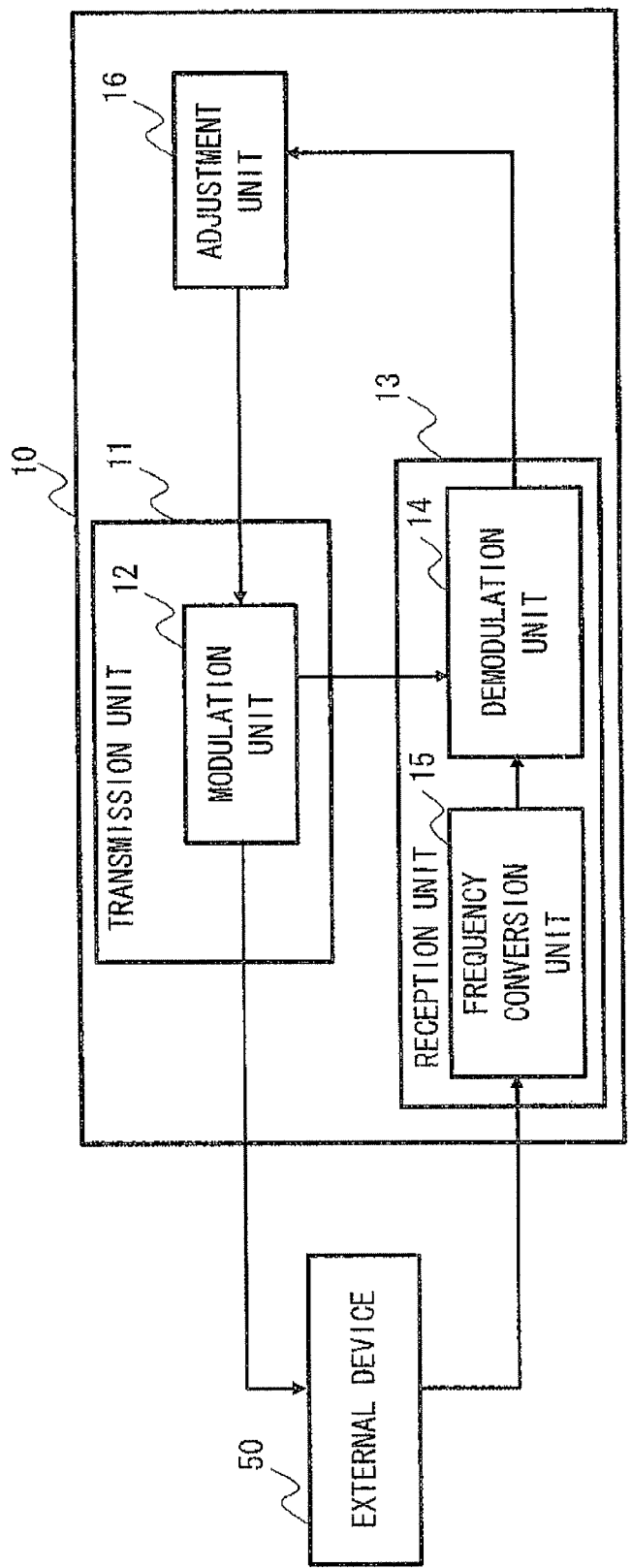
FIG. 1 is a block diagram of a modem device according to a first exemplary embodiment.

Hereinafter, an exemplary embodiment of the present invention is explained with reference to the drawings. A configuration example of a modem device according to a first exemplary embodiment of the present invention is explained using FIG. 1. A modem device 10 includes a transmission unit 11, a reception unit 13, and an adjustment unit 16. The transmission unit 11 includes a modulation unit 12. The reception unit 13 includes a demodulation unit 14 and a frequency conversion unit 15. Moreover, the modem device 10 communicates with an external device 50 using wireless signals.

The modulation unit 12 modulates a transmission signal and generates a modulated signal. The modulation unit 12 uses a local signal with a variable frequency at the time of generating the modulated signal. The local signal with the variable frequency may be generated by a frequency synthesizer that makes a frequency variable within a predetermined frequency range and outputs a local signal or may be generated by a plurality of oscillators that output a local signal with a fixed frequency. The modulation unit 12 outputs the generated modulated signal to the demodulation unit 14 or the external device 50.

The frequency conversion unit 15 converts a frequency of an external input signal input from the external device 50 and generates an intermediate frequency signal. For example, the frequency conversion unit 15 converts the frequency of the external input signal, which is a high frequency signal, into a frequency of an intermediate frequency band.

The demodulation unit 14 demodulates the modulated signal output from the modulation unit 12 or the intermediate frequency signal output from the frequency conversion unit 15 and generates a reception signal. The demodulation unit 14 outputs a demodulated signal, which is a demodulated modulated signal output from the modulation unit 12, to the adjustment unit 16.

The adjustment unit 16 adjusts an amplitude of the transmission signal to be output to the modulation unit 12 based on the reception signal output from the demodulation unit 14. Adjusting the amplitude of the transmission signal in the adjustment unit 16 enables reduction in the amplitude error generated in the modulated signal output from the modulation unit 12.

Next, flows of signals in the modem device 10 and the external device 50 in FIG. 1 are explained. The modem device 10 selects either a communication mode for communicating with the external device 50 or an adjustment mode for adjusting amplitude of the transmission signal to be input to the modulation unit 11.

First, the flow of the signal in the modem device 10 when the communication mode is selected is explained. The modulation unit 12 generates a transmission modulated signal using a frequency set at the time of outputting the transmission signal to the external device 50. Further, the modulation unit 12 outputs the generated transmission modulated signal to the external device 50. The frequency conversion unit 15 converts the frequency set to the external input signal input from the external device 50 into the frequency of the intermediate frequency band and generates an intermediate frequency signal. The demodulation unit 14 demodulates the intermediate frequency signal and generates a reception signal.

Next, the flow of the signal in the modem device 10 when the adjustment mode is selected is explained. The modulation unit 12 generates a modulated signal with substantially the same frequency as the frequency set to the intermediate frequency signal output from the frequency conversion unit 15. Moreover, the modulation unit 12 outputs the generated modulated signal to the demodulation unit 14, without passing the modulated signal through the frequency conversion unit 15. The demodulation unit 14 demodulates the output modulated signal and generates a reception signal. The adjustment unit 16 adjusts amplitude of the transmission signal output to the modulation unit 12 based on the reception signal output from the demodulation unit 14 at the time of operation in the adjustment mode.

As explained above, using the modem device 10 in FIG. 1, the modulation unit 12 can set the same frequency as the intermediate frequency signal output from the frequency conversion unit 15 in the adjustment mode to be output to the demodulation unit 14. Therefore, the modulated signal fed back from the transmission unit 11 to the reception unit 13 is output to the demodulation unit 14 without passing through the frequency converter 15. Then, the demodulation unit 14 demodulates the modulated signal not influenced by noise in the frequency converter 15 and generates the reception signal. Additionally, the demodulation unit 14 can output the generated reception signal to the adjustment unit 16.

Figure 2:
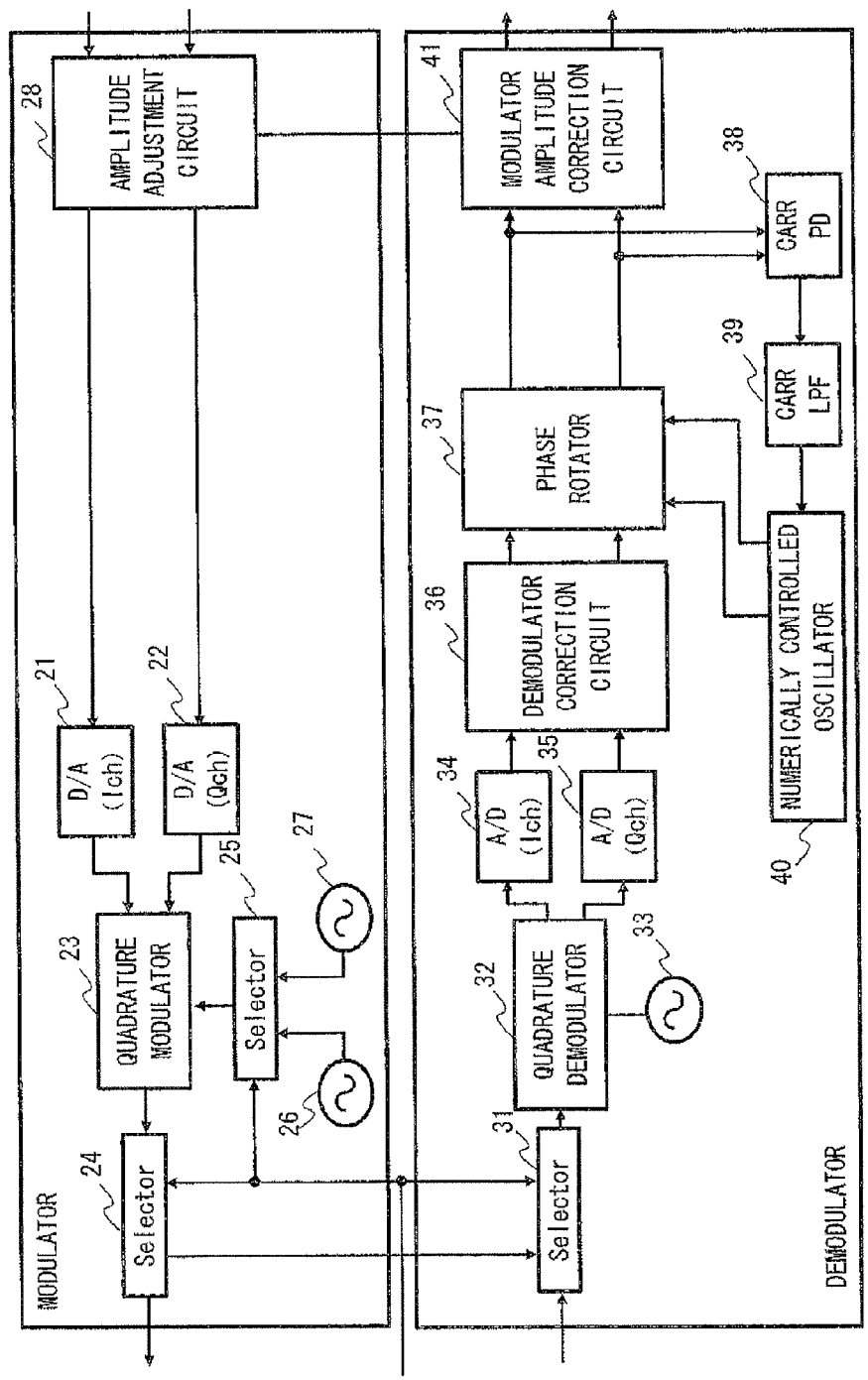
FIG. 2 is a block diagram of the modem device according to the first exemplary embodiment.

Next, a specific configuration example of the modem device according to the first exemplary embodiment of the present invention is explained using FIG. 2. The modem device 10 includes on the modulator side (transmission unit side) a digital-to-analog (D/A) converter 21, a D/A converter 22, a quadrature modulator 23, a selector 24, a selector 25, an oscillator 26, an oscillator 27, and an amplitude adjustment circuit 28. Further, the modem device 10 includes on the demodulator side (reception unit side) a selector 31, a quadrature modulator 32, an oscillator 33, an analog-to-digital (A/D) converter 34, an A/D converter 35, a demodulator correction circuit 36, a phase rotator 37, a CARR PD 38, a CARR LPF 39, a numerically controlled oscillator 40, and a modulator amplitude correction circuit 41. In FIG. 2, an example is explained in which the demodulator obtains the intermediate frequency signal with the frequency converted by the frequency converter 15. Note that the frequency conversion unit 15 may be included in the demodulator.

The D/A converter 21 converts the in-phase component signal (hereinafter referred to as Ich) output from the amplitude adjustment circuit 28 into an analog signal. The D/A converter 21 outputs Ich that is converted into the analog signal to the quadrature modulator 23. Moreover, the D/A converter 22 converts a quadrature component signal (hereinafter referred to as Qch) output from the amplitude adjustment circuit 28 into an analog signal. The phase of Qch is shifted by $\pi/2$ from that of Ich. The D/A converter 22 outputs Qch that is converted into the analog signal to the quadrature modulator 23. Note that Ich and Qch are general notations of a quadrature baseband component.

The quadrature modulator 23 quadrature modulates the baseband signal Ich and the baseband signal Qch with a local signal tx_local selected by the selector 25 as a carrier. The quadrature modulator 23 outputs to the selector 24 a quadrature modulated signal QMODOUT that is generated by quadrature modulating the baseband signal Ich and the baseband signal Qch.

The selector 25 selects a frequency of the carrier used in the quadrature modulator 23. That is, the selector 25 selects whether a local signal fc_lb of the oscillator 26 is to be a carrier or a local signal fc_tx of the oscillator 27 is to be a carrier. The selector 25 selects either the local signal fc_lb or the local signal fc_tx using an IFLOOPBACK switching signal input externally. The IFLOOPBACK switching signal is used for switching the adjustment mode and the communication mode. When the IFLOOPBACK switching signal is set to the adjustment mode, the selector 25 selects the local signal fc_lb and outputs it to the quadrature modulator 23. When the IFLOOPBACK switching signal is set to the communicate mode, the selector 25 selects the local signal fc_tx and outputs it to the quadrature modulator 23.

Moreover, the same frequency as the intermediate frequency signal input to the demodulator is set to the local signal fc_lb. Alternatively, the same frequency as the local signal fc_rx output from the oscillator 33 may be set.

The selector 24 selects whether to output the quadrature modulated signal QMODOUT output from the quadrature modulator 23 as an output signal IFOUT to be output to the external device 50 or as an output signal IFLOOPBACKOUT to be output to the demodulator side. The selector 24 selects the output destination using the IFLOOPBACK switching signal. When the IFLOOPBACK switching signal is set to the adjustment mode, the selector 24 outputs the output signal IFLOOPBACKOUT. When the IFLOOPBACK switching signal is set to the communicate mode, the selector 24 outputs the output signal IFOUT.

The selector 31 selects either an intermediate frequency signal IFIN, which is input from the external device 50 and converted into the frequency of the intermediate frequency band by the frequency converter 15, or the output signal IFLOOPBACKOUT output from the selector 24, and outputs it to the quadrature demodulator 32. The selector 31 selects the output destination using the IFLOOPBACK switching signal. When the IFLOOPBACK switching signal is set to the adjustment mode, the selector 31 outputs the output signal IFLOOPBACKOUT to the quadrature demodulator 32. When the IFLOOPBACK switching signal is set to the communicate mode, the selector 31 outputs the intermediate frequency signal IFIN to the quadrature demodulator 32.

The quadrature demodulator 32 quadrature modulates the signal output from the selector 31 using the local signal fc_rx output from the oscillator 33. The quadrature demodulator 32 demodulates the baseband signal Ich and the baseband signal Qch using the local signal fc_rx and a signal with the phase shifted by $\pi/2$ from that of the local signal fc_rx. The quadrature demodulator 32 generates a baseband signal of the frequency band that is sufficiently lower than the frequency of the intermediate frequency band for the intermediate frequency signal IFIN or the output signal IFLOOPBACK.

The analog-to-digital (A/D) converter 34 converts the baseband signal Ich into a digital signal. The A/D converter 35 converts the baseband signal Qch into a digital signal. Note that in this drawing, the A/D converter 34 and the A/D converter 35 are disposed in the subsequent stages of the quadrature modulator 32, however they may be disposed in the previous stages of the quadrature modulator 32.

The demodulator correction circuit 36 corrects an amplitude difference between the baseband signal Ich and the baseband signal Qch that are generated in the quadrature modulator 32. Alternatively, the demodulator correction circuit 36 corrects the amplitude difference between the digital signal Ich and the digital signal Qch that is generated in the A/D converter 34 and the A/D converter 35.

The phase rotator 37 removes phase rotation generated in the digital signal Ich and the digital signal Qch output from the demodulator correction circuit 36 and outputs a regenerated signal Ich and a regenerated signal Qch. Specifically, the phase rotator 37 outputs the regenerated signal Ich and the regenerated signal Qch by feedback control using the CARR PD 38, the CARR LPF 39, and the numerically controlled oscillator 40.

The CARR PD 38 generates a reference signal. The CARR PD 38 detects a phase error between the reference signal and the regenerated signal Ich and further detects a phase error between the reference signal and the regenerated signal Qch. The CARR PD 38 outputs a phase error signal PDOUT indicating the detected phase error. The phase error signal PDOUT should at least indicate whether the phases of the regenerated signal Ich and the regenerated signal Qch are ahead or behind. For example, when the phase of the regenerated signal is ahead, the CARR PD 38 generates the phase error signal PDOUT of "+1", whereas when the phase of the regenerated signal is behind, the CARR PD 38 generates the phase error PDOUT of "−1". Moreover, the CARR PD 38 may generate the phase error signal PDOUT having continuous values according to the degree of delay or advance of the phase.

The CARR LPF 39 removes the high frequency component of the phase error signal PDOUT output from the CARR PD 38, and outputs a phase error integrated signal LPFOUT to the numerically controlled oscillator 40.

The numerically controlled oscillator 40 is a sinusoidal oscillator that generates a sinusoidal signal. The frequency of the sinusoidal signal changes according to the size of the phase error integrated signal LPFOUT. The numerically controlled oscillator 40 converts the phase error integrated signal LPFOUT into a value corresponding to an angle. The numerically controlled oscillator 40 generates a control signal cos $\Delta\omega t$ and a control signal sin $\Delta\omega t$ indicating the value corresponding to the angle and outputs them to the phase rotator 37. The control signal cos $\Delta\omega t$ and the control signal sin $\Delta\omega t$ are signals with phases different by $\pi/2$ from each other.

The phase rotator 37 provides rotation to the regenerated signal Ich and the regenerated signal Qch that are output from the demodulator correction circuit 36 based on the control signal cos $\Delta\omega t$ and the control signal sin $\Delta\omega t$. Then, the regenerated signal Ich and the regenerated signal Qch with the phase error removed can be output to the modulator amplitude correction circuit 41.

Figure 3:
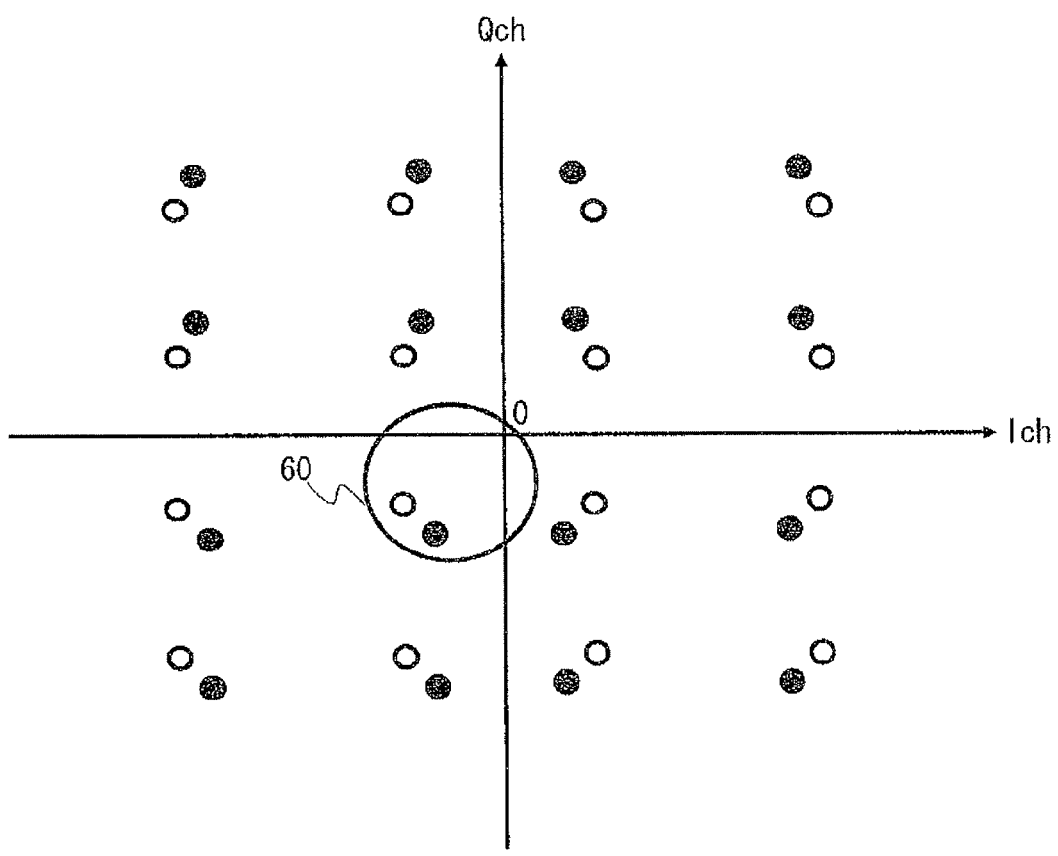
FIG. 3 is a diagram showing a constellation according to the first exemplary embodiment.

As shown in FIG. 3, the modulator amplitude correction circuit 41 detects an amplitude difference between the regenerated signal Ich and the regenerated signal Qch that is generated on the modulator side and an amplitude shift from a lattice point in the quadrature modulation system (16 QAM in the example of FIG. 3). An example of a constellation indicated by the regenerated signal Ich and the regenerated signal Qch is explained here using FIGS. 3 and 4.

Figure 4:
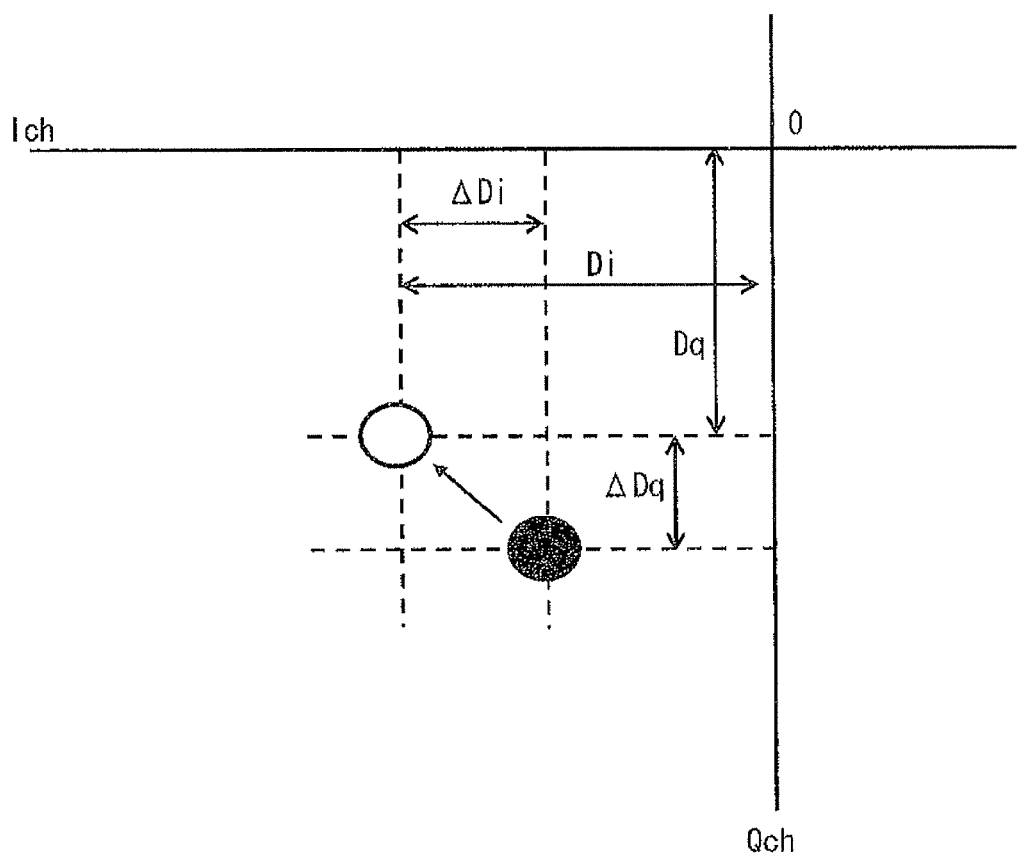
FIG. 4 is a diagram showing a constellation according to the first exemplary embodiment.
Figure 5:
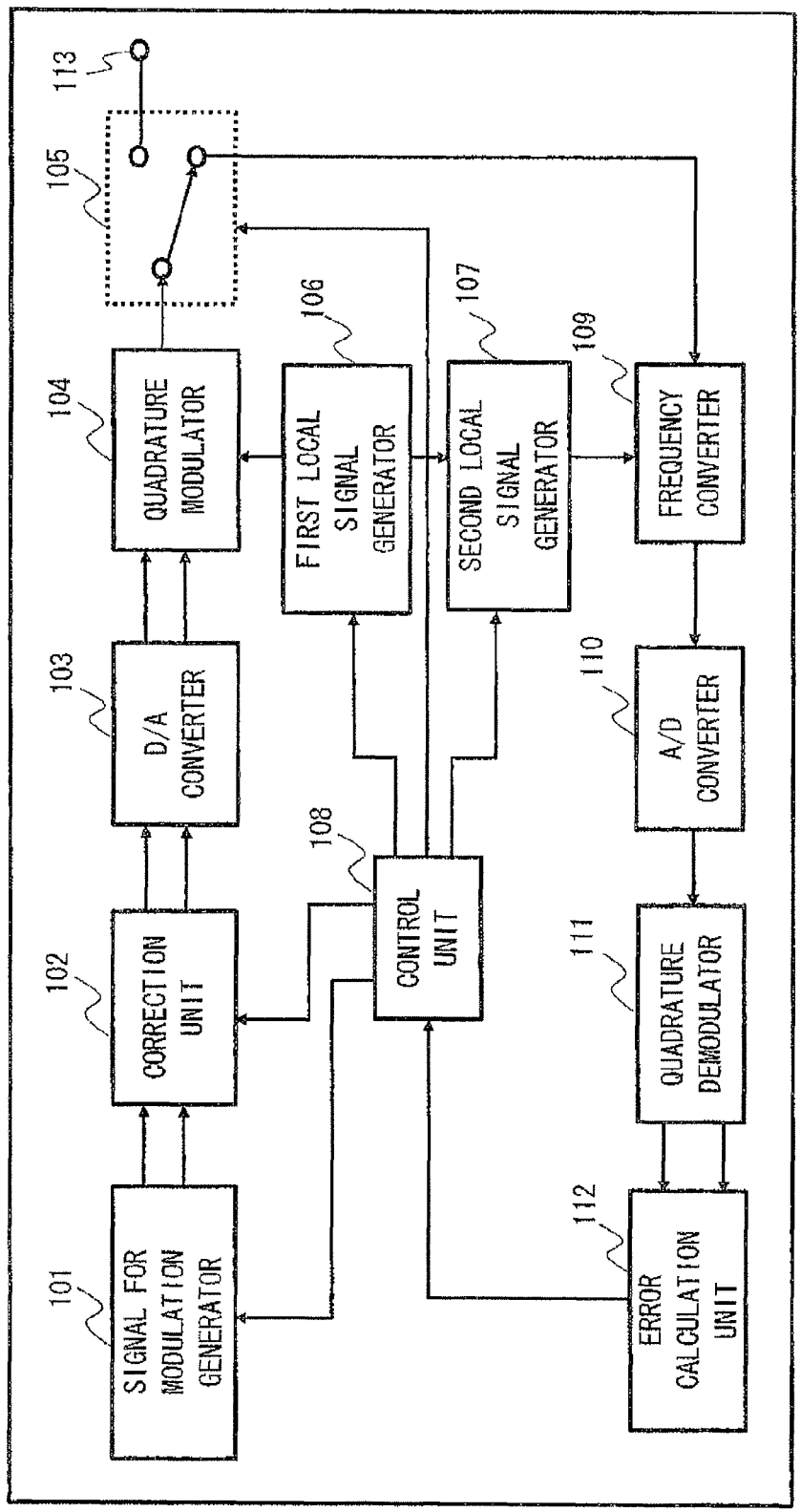
FIG. 5 is a block diagram of a quadrature modulation device according to Patent Literature 1.

In FIG. 3, the horizontal axis indicates amplitude of the regenerated signal Ich, and the vertical axis indicates amplitude of the regenerated signal Qch. Moreover, the points indicated by white circles are normal signal points for 16 QAM. The points indicated by black circles are signal points with amplitude shift being generated and are signal points of the regenerated signal Ich and the regenerated signal Qch. FIG. 4 is a diagram showing an enlarged view of a circle 60 in FIG. 3.

In FIG. 4, Di indicates the amplitude of the regenerated signal Ich at a normal signal point. Further, Dq indicates the amplitude of the regenerated signal Qch at a normal signal point. An amplitude difference between the normal signal point and the signal point with amplitude shift being generated for Ich is indicated by ΔDi. An amplitude difference between the normal signal point and the signal point with amplitude shift being generated for Qch is indicated by ΔDq.

The modulator amplitude correction circuit 41 performs correction to eliminate ΔD1 and ΔD1 indicating the amplitude difference for the regenerated signal Ich and the regenerated signal Qch, and performs correction so that the signal point with amplitude shift being generated overlaps on the normal signal point. Moreover, in the adjustment mode, the modulator amplitude correction circuit 41 outputs information regarding ΔDi and ΔDq in an amplitude correction signal to the amplitude adjustment circuit 28 as information regarding the amplitude shift generated on the modulator side. The amplitude adjustment circuit 28 adjusts the amplitude of Ich and Qch in order not to generate the amplitude shift on the modulator side based on the amplitude correction signal and outputs them to the D/A converter 21 and the D/A converter 22.

As explained above, by the modem device according to the first exemplary embodiment of the present invention, the selector 25 can select the frequency according to whether the mode in which the modem device 10 is operating is the adjustment mode or the communication mode and output a local signal. That is, in the case of the adjustment mode, it is possible to generate the modulated signal using the local signal with the same frequency as the frequency set to the intermediate frequency signal IFIN. Then, the quadrature demodulator 32 can obtain the output signal IFLOOPBACKOUT without frequency conversion in the frequency converter 15 when the output signal IFLOOPBACKOUT is obtained from the modulator side. Then, the output signal IFLOOPBACKOUT is not influenced by the noise in the frequency conversion unit 15.

Note that the present invention is not limited to the above exemplary embodiment, but can be modified as appropriate in the range not departing from the scope.

Although the present invention has been explained with reference to the exemplary embodiment, the present invention is not limited by above. Various modifications that can be understood by those skilled in the art can be made to the configurations and details of the present invention in the scope of the invention.

The present application claims priority rights of and is based on Japanese Patent Application No. 2010-143633 filed on Jun. 24, 2010 in the Japanese Patent Office, the entire contents of which are hereby incorporated by reference.

REFERENCE SIGNS LIST

10 MODEM DEVICE
11 TRANSMISSION UNIT
12 MODULATION UNIT
13 RECEPTION UNIT
14 DEMODULATION UNIT
15 FREQUENCY CONVERSION UNIT
16 ADJUSTMENT UNIT
21 D/A CONVERTER
22 D/A CONVERTER
23 QUADRATURE MODULATOR
24 SELECTOR
25 SELECTOR
26 OSCILLATOR
27 OSCILLATOR
28 AMPLITUDE ADJUSTMENT CIRCUIT
31 SELECTOR
32 QUADRATURE DEMODULATOR
33 OSCILLATOR
34 A/D CONVERTER
35 A/D CONVERTER
36 DEMODULATOR CORRECTION CIRCUIT
37 PHASE ROTATOR
38 CARR PD
39 CARR LPF
40 NUMERICALLY CONTROLLED OSCILLATOR
41 MODULATOR AMPLITUDE CORRECTION CIRCUIT
42 FREQUENCY CONVERTER
43 OSCILLATOR
50 EXTERNAL DEVICE

The invention claimed is:

1. A modem device comprising:
   a modulation circuit configured to modulate a transmission signal and to generate a modulated signal;
   a frequency conversion circuit configured to convert a frequency of an external input signal and to generate an intermediate frequency signal, the external input signal being input from an external device;
   a demodulation circuit configured to demodulate the modulated signal or the intermediate frequency signal and to generate a reception signal; and
   an adjustment circuit configured to adjust amplitude of the transmission signal based on the reception signal, wherein
   in a communication mode for communicating with the external device,
      the modulation circuit is configured to output a first modulated signal to the external device, the first modulated signal being generated using the first frequency set at the time of output to the external device,
      the frequency conversion circuit is configured to convert a second frequency set to the external input signal into the intermediate frequency signal with a third frequency, and
      the demodulation circuit is configured to demodulate the intermediate frequency signal and to generate a first reception signal, and
   in an adjustment mode for adjusting the amplitude of the transmission signal,
      the modulation circuit is configured to output a second modulated signal generated using the third frequency to the demodulation circuit without passing the second modulated signal through the frequency conversion circuit,
      the demodulation circuit is configured to demodulate the second modulated signal and generates to generate a second reception signal, and
      the adjustment circuit is configured to adjust the amplitude of the transmission signal based on the second reception signal.

2. The modem device according to claim 1, further comprising:
   a first oscillator configured to output a local signal with the first frequency; and
   a second oscillator configured to output a local signal with the third frequency, wherein
   the modulation circuit
      is configured to generate the first modulated signal using the local signal output from the first oscillator when the modem device operates in the communication mode, and
      is configured to generate the second modulated signal using the local signal output from the second oscillator when the modem device operates in the adjustment mode.

3. The modem device according to claim 1, further comprising:
   a first selection circuit configured to select either one of the local signals output from the first or the second oscillator to be output to the modulation circuit;
   a second selection circuit configured to select either the demodulation circuit or the external device and to output the first modulated signal generated by the modulation circuit; and
   a third selection circuit configured to select either the second modulated signal output from the modulation circuit or the intermediate frequency signal to be output to the demodulation circuit, wherein
   in the communication mode,
      the first selection circuit is configured to select the local signal output from the first oscillator,
      the second selection circuit is configured to select the external device, and
      the third selection circuit is configured to select the intermediate frequency signal, and
   in the adjustment mode,
      the first selection circuit is configured to select the local signal output from the second oscillator,
      the second selection circuit is configured to select the demodulation circuit, and
      the third selection circuit is configured to select the second modulated signal.

4. The modem device according to claim 1, wherein
   the modulation circuit is configured to quadrature modulate an in-phase component signal and a quadrature component signal, and
   the demodulation circuit is configured to quadrature demodulate the in-phase component signal and the quadrature component signal from the modulated signal or the external input signal.

5. An amplitude adjustment method comprising:
   modulating a transmission signal and generating a modulated signal;
   converting a frequency of an external input signal and generating an intermediate frequency signal, the external input signal being input from an external device;
   demodulating the modulated signal or the intermediate frequency signal and generating a reception signal;
   adjusting amplitude of the transmission signal based on the reception signal, wherein
   in a communication mode for communicating with the external device,
      generating the modulated signal comprises outputting a first modulated signal to the external device, the first modulated signal being generated using a first frequency set at the time of output to the external device,
      generating the intermediate frequency signal comprises converting a second frequency set to the external input signal into an intermediate frequency, that is a third frequency, and generating the intermediate frequency signal, and
      generating the reception signal comprises demodulating the intermediate frequency signal with the third frequency being set and generating a first reception signal, and
   in an adjustment mode for adjusting the amplitude of the transmission signal,
      generating the modulated signal comprises generating a second modulated signal using the third frequency,
      generating the reception signal comprises demodulating the second modulated signal and generating a second reception signal without executing the step for generating the intermediate frequency signal, and
      adjusting the amplitude of the transmission signal comprises adjusting the amplitude of the transmission signal based on the second reception signal.

* * * * *

UNITED STATES PATENT AND TRADEMARK OFFICE
CERTIFICATE OF CORRECTION

PATENT NO. : 8,897,346 B2  
APPLICATION NO. : 13/806596  
DATED : November 25, 2014  
INVENTOR(S) : Taro Teramoto Page 1 of 1

It is certified that error appears in the above-identified patent and that said Letters Patent is hereby corrected as shown below:

In the Claims

Column 9, Line 36: In Claim 1, after "and" delete "generates"

Signed and Sealed this
Fifteenth Day of September, 2015

Michelle K. Lee
*Director of the United States Patent and Trademark Office*